United States Patent Office 3,487,446
Patented Dec. 30, 1969

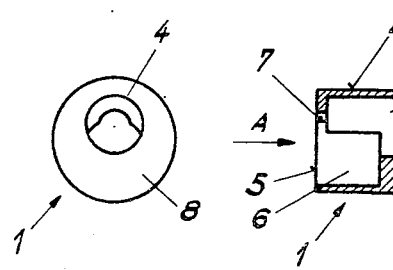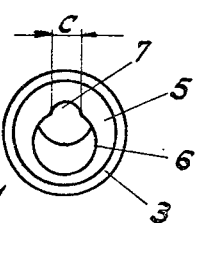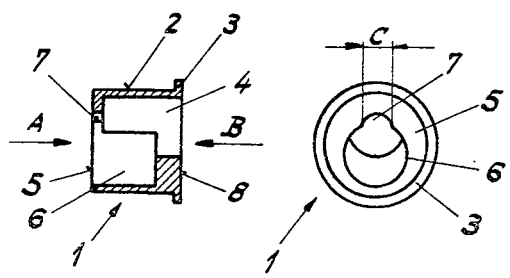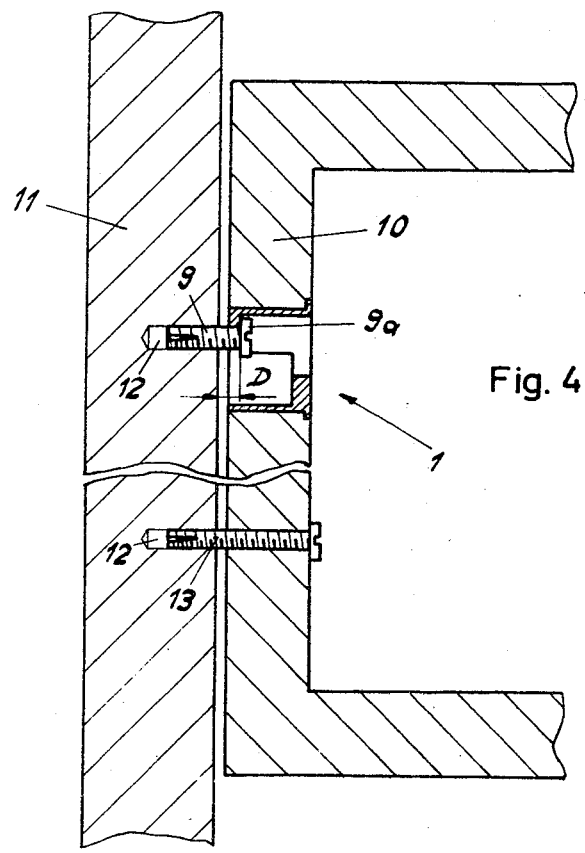

3,487,446
SUSPENSION MOUNTING FOR HOME-CONSTRUCTED FURNITURE
Franz Hero and Karl Odermatt, both of 8630 Tann-Ruti, and Walter Muller, 8714 Feldbach, all of Zurich, Switzerland
Filed July 18, 1968, Ser. No. 745,859
Claims priority, application Switzerland, July 27, 1967, 10,662/67
Int. Cl. A47f 5/00; A47q 29/02
U.S. Cl. 248—223          3 Claims

ABSTRACT OF THE DISCLOSURE

The fastener comprises a cylindrical body with a blind bore in each face, the two bores meeting over a common cross-sectional area, and adjoining one bore is a semi-circular recess, the entire area of which is common with the other bore. A screw with a head is inserted through the other bore and through the recess, the screw shank having a diameter equal to or a trifle smaller than that of the recess and thereby supporting the fastener.

BACKGROUND OF THE INVENTION

The invention relates to a suspension mounting for fastening together the parts of furniture intended to be put together by the purchaser.

There are available on the market various articles of furniture, particularly living-room cabinets, which can be put together and enlarged by fastening together the parts thereof. These articles comprise vertical supports between which the cabinet subunits and shelves are mounted as desired. This sort of furniture is delivered broken down, to be assembled by the buyer. The assembly, and particularly the fastening of the cabinet subunits to the vertical supports, is wearisome, since these parts are screwed together, the screws being screwed from inside the cabinet subunit through the sidewalls thereof and into holes in the supports.

SUMMARY OF THE INVENTION

The purpose of the invention is to provide a suspension mounting for furniture of the kind described, which mounting greatly facilitates the fastening of cabinet subunits to the vertical members.

BRIEF DESCRIPTION OF THE DRAWING

The invention will be described, with reference to the figures of the accompanying drawings, wherein:

FIG. 1 is a side view in cross section of the suspension mounting of the invention;

FIG. 2 is an end-on view in the direction of the arrow A in FIG. 1;

FIG. 3 is an end-on view in the direction of arrow B in FIG. 1; and

FIG. 4 is a view in cross section of a cabinet subunit and support, with a mounting of the invention positioned in a side wall of the subunit.

DESCRIPTION OF THE PREFERRED EMBODIMENT

With reference to FIGS. 1 to 3, the suspension mounting comprises a hollow cylindrical body 1 made of a suitable material, such as brass or synthetic plastic, and which incorporates, on the end face 8, a flange 3 that projects beyond the outer side surface of the body 1. An eccentrically located bore 4 is embodied in the face 8. The opposite end face 5 incorporates an opening composed of an eccentric bore 6 and an adjoining semi-circular or arcuate recess 7. The bore 6 is somewhat larger in diameter than the head 9a of a screw 9, which, as illustrated in FIG. 4, is used with the mounting. The diameter or width C of the semi-circular or arcuate recess 7 is as large or a trifle larger than the diameter of the shank of the screw 9, and the axes of the recess and of the bore 4 coincide. The bore 4 permits the screw head 9a to be inserted into the suspension-mounting body 1, the recess 7 bearing on the screw shank so that the latter supports the body. The screw head exerts a rear thrust on the end face 5.

FIG. 4 illustrates the manner in which a suspension mounting is built into a cabinet subunit 10 and how the latter is fixed to a support 11.

Two suspension mountings are inserted from the inside into respective bores located at the same height in the side wall of the subunit 10, so that their end faces 5 are flush with the outer face of the side wall and the recess 7 is located above, as shown in FIG. 4. Two screws 9 are screwed into two of the bores 12 which form, in a known manner, two vertical rows in the support 11. The screw head 9a should be spaced a distance D of approximately 4 mm. from the support. Two suspension mountings are also inserted in like manner in the opposite side wall of the subunit and the adjacent support provided with two screws 9. The subunit 10 can now be suspended from the screws of one of the supports 11, such as the left one, as shown in FIG. 4. Since there is still a clearance of approximately 2 mm. between the support 11 and the side wall of the subunit, the opposite side of the latter can be swung up somewhat, so that the two screws of the right support 11 can be inserted into their suspension mountings. After the other parts, such as shelves, have been mounted, the screws 9 are driven home with a screwdriver, the side walls of the cabinet subunit 10 coming to bear against the respective supports 11. Subsequently, two fixing screws 13 are screwed from the inside of the subunit into respective bores 12 of each support 11. Additional supports 11 and subunits 10 are mounted in the same manner. Since the subunits are still free to pivot through a small angle after they are hung, it is very easy to mount additional supports 11.

We claim:

1. A suspension mounting with a fastening screw having a head for mounting cabinet subunits on the vertical supports of furniture, particularly living-room cabinets, which is put together and enlarged by fastening together the parts thereof, including a cylindrical body member, first and second spaced end faces incorporated by said body member, a first bore in said first face parallel to the axis of said cylindrical body member, a flange in said first face projecting beyond the outer side surface of said cylindrical body member, an opening in said second end face, said opening comprising a second bore positioned eccentrically in said cylindrical body member and parallel to the axis thereof and having a diameter greater than that of the head of the screw, and said opening also comprising a recess adjoining said second bore, said recess having a width equal to or slightly greater than the diameter of the shaft of the screw for permitting the screw to project through said recess.

2. The suspension mounting as defined in claim 1, wherein said first bore is positioned eccentrically in, and defines an axis parallel to, said cylindrical body member, and said recess defines an axis coincident with that of said first bore.

3. The suspension mounting as defined in claim 2, wherein said first and second bores have a common cross sectional area over which they communicate, and said recess communicates over its entire cross sectional area with said first bore, said first bore stops short of said second face, and said recess is located sufficiently inwardly of the outer side surface of said cylindrical body member so that there is provided a wall defined in part by the periphery of said recess and that of said first bore and having a thickness equal to the difference between the length of said first bore and that of said cylindrical body member, said wall serving as the bearing surface for the head of the screw inserted into the suspension mounting through said first bore and projecting through said recess, whereby the wall surface thereof bears on the screw shank to support the suspension mounting.

References Cited

UNITED STATES PATENTS

| | | | |
|---|---|---|---|
| 1,794,638 | 3/1931 | Mueller | 248—224 X |
| 2,692,689 | 10/1954 | Wynne | 248—223 X |
| 3,312,027 | 4/1967 | Lainer | 248—224 X |

ROY D. FRAZIER, Primary Examiner

J. F. FOSS, Assistant Examiner

U.S. Cl. X.R.

211—87; 248—239; 312—245